United States Patent
Yuasa (10) Patent No.: US 10,422,861 B2
(45) Date of Patent: Sep. 24, 2019

(54) ELECTRO-OPTICAL DISTANCE MEASURING INSTRUMENT

(71) Applicant: TOPCON Corporation, Tokyo-to (JP)

(72) Inventor: Taichi Yuasa, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 429 days.

(21) Appl. No.: 15/284,908

(22) Filed: Oct. 4, 2016

(65) Prior Publication Data

US 2017/0102454 A1 Apr. 13, 2017

(30) Foreign Application Priority Data

Oct. 7, 2015 (JP) ................................. 2015-199198

(51) Int. Cl.
| | |
|---|---|
| G01S 7/00 | (2006.01) |
| G01S 7/481 | (2006.01) |
| G01S 17/08 | (2006.01) |
| G01S 17/42 | (2006.01) |
| G01S 7/497 | (2006.01) |

(52) U.S. Cl.
CPC .......... *G01S 7/4816* (2013.01); *G01S 7/4812* (2013.01); *G01S 7/4817* (2013.01); *G01S 7/497* (2013.01); *G01S 17/08* (2013.01); *G01S 17/42* (2013.01)

(58) Field of Classification Search
USPC ............................................... 356/4.01, 5.01
See application file for complete search history.

(56) References Cited

U.S. PATENT DOCUMENTS

| | | | |
|---|---|---|---|
| 6,115,123 A | 9/2000 | Stappaerts et al. | |
| 2004/0027554 A1 | 2/2004 | Ishinabe | |

(Continued)

FOREIGN PATENT DOCUMENTS

| | | |
|---|---|---|
| CN | 1740817 A | 3/2006 |
| GB | 2235789 A | 3/1991 |

(Continued)

OTHER PUBLICATIONS

European communication dated Feb. 28, 2017 in corresponding European patent application No. 16192665.4.

*Primary Examiner* — James R Hulka
(74) *Attorney, Agent, or Firm* — Nields, Lemack & Frame, LLC (57) ABSTRACT

The invention provides an electro-optical distance measuring instrument, which comprises a light projecting optical system for projecting a distance measuring light as emitted from a distance measuring light source on a distance measuring optical axis, and a light receiving optical system for receiving a reflected distance measuring light from an object to be measured and for guiding to a light receiving element, wherein the light projecting optical system and the light receiving optical system are disposed so that a projection optical axis and a light receiving optical axis cross each other, an optical path splitting component for reflecting the distance measuring light to a crossing position of the projection optical axis and the light receiving optical axis and for passing through the reflected distance measuring light is provided, and optical path length adjusting components for correcting an optical path length of the reflected distance measuring light are disposed on the optical path of the reflected distance measuring light.

7 Claims, 4 Drawing Sheets

(56) References Cited

U.S. PATENT DOCUMENTS

| | | | |
|---|---|---|---|
| 2009/0201488 A1* | 8/2009 | Yamada | G01S 3/784 356/4.01 |
| 2011/0235018 A1* | 9/2011 | Mori | G01C 3/08 356/5.01 |
| 2011/0310377 A1* | 12/2011 | Ohishi | G01S 7/497 356/5.01 |
| 2012/0013886 A1* | 1/2012 | Park | G01S 7/4812 356/4.01 |
| 2014/0078514 A1* | 3/2014 | Zhu | G01B 11/24 356/606 |
| 2014/0111618 A1 | 4/2014 | Kumagai et al. | |
| 2015/0043009 A1* | 2/2015 | Bridges | G01S 17/42 356/610 |
| 2016/0003945 A1* | 1/2016 | Setono | G01S 17/42 356/5.01 |

FOREIGN PATENT DOCUMENTS

| | | |
|---|---|---|
| JP | 2000-186928 A | 7/2000 |
| JP | 2004-69611 A | 3/2004 |
| JP | 2011-149760 A | 8/2011 |
| JP | 2014-85134 A | 5/2014 |

* cited by examiner

ELECTRO-OPTICAL DISTANCE MEASURING INSTRUMENT

BACKGROUND OF THE INVENTION

The present invention relates to an electro-optical distance measuring instrument, by which receives a reflection light from an object to be measured and performs a distance measurement.

A surveying instrument such as a laser scanner, a total station, or the like has an electro-optical distance measuring instrument for detecting a distance to an object to be measured by a prism distance measurement using a reflection prism and a non-prism distance measurement without using the reflection prism.

In the electro-optical distance measuring instrument, an optical path splitting component is disposed on a projection optical axis. By the optical path splitting component, a distance measuring light is reflected and projected, further a reflected distance measuring light from the object to be measured is passed through, a light receiving optical system receives the reflected distance measuring light, and a distance measurement is performed.

In a conventional electro-optical distance measuring instrument, a partial transmission coating is formed at a central part of the optical path splitting component, and the central part is designed as a beam splitter. Further, an antireflection coating (an AR coating) is provided at a part other than the central part, and the part other than the central part is designed as a full transmission part. In such electro-optical distance measuring instrument, the reflected distance measuring light passes through the full transmission part and is received by the light receiving optical system, and the distance measurement is performed. Further, a part of the central part of the reflected distance measuring light also passes through the beam splitter and is received by the light receiving optical system.

As described above, the central part of the optical path splitting component is the beam splitter, and the part of the central part of the reflected distance measuring light passes through the beam splitter and enters the light receiving optical system. Therefore, even at a short distance measurement, the reflected distance measuring light with a light amount which may not cause a trouble in a measurement can be received.

However, in a case of the electro-optical distance measuring instrument with the optical path splitting component, in which a beam splitter is provided at the central part, all of the reflected distance measuring lights which enter a condenser lens of the light receiving optical system need to pass through the optical path splitting component. Therefore, the optical path splitting component becomes large, and an increase in size of an optical system is unavoidable. Further, a weight is also increased according to the increase in size.

SUMMARY OF THE INVENTION

It is an object of the present invention to provide an electro-optical distance measuring instrument, by which it is possible to miniaturize an optical system without decreasing a light receiving amount.

To attain the object as described above, an electro-optical distance measuring instrument according to the present invention comprises a light projecting optical system for projecting a distance measuring light as emitted from a distance measuring light source on a distance measuring optical axis, and a light receiving optical system for receiving a reflected distance measuring light from an object to be measured and for guiding to a light receiving element, wherein the light projecting optical system and the light receiving optical system are disposed so that a projection optical axis and a light receiving optical axis cross each other, an optical path splitting component for reflecting the distance measuring light to a crossing position of the projection optical axis and the light receiving optical axis and for passing through the reflected distance measuring light is provided, and optical path length adjusting components for correcting an optical path length of the reflected distance measuring light are disposed on the optical path of the reflected distance measuring light.

Further, in the electro-optical distance measuring instrument according to the present invention, the optical path length adjusting components are transparent optical components, in which holes are formed at central parts, the holes are set in such a size that only the reflected distance measuring light as passed through the optical path splitting component passes, and a board thicknesses of the optical path length adjusting components are set so that the optical path length of the reflected distance measuring light as passed through the optical path splitting component and extended becomes equal to the optical path length of the reflected distance measuring light as passed through the optical path length adjusting component and extended.

Further, in the electro-optical distance measuring instrument according to the present invention, the light receiving optical system has condenser lenses, and the optical path length adjusting components are provided at either one of an incident side or an emitting side of the condenser lenses.

Further, in the electro-optical distance measuring instrument according to the present invention, the light receiving optical system has condenser lenses, in which a hole is formed at the central part, and the optical path length adjusting components as provided at the hole, and the board thicknesses of the optical path length adjusting components are set so that the optical path length of the reflected distance measuring light as passed through the optical path splitting component and the optical path length adjusting components becomes equal to the optical path length of the reflected distance measuring light which does not pass through the optical path splitting component.

Further, in the electro-optical distance measuring instrument according to the present invention, the reflected distance measuring light from the object to be measured is configured so as to enter the light receiving optical system via a window unit, and the optical path length adjusting component is attached on the window unit.

Further, the electro-optical distance measuring instrument according to the present invention comprises a scanning mirror for projecting the distance measuring light in rotary irradiation, and the reflected distance measuring light is configured so as to be received via the scanning mirror, wherein the optical path length adjusting component is a mirror provided at a central part of the scanning mirror, a size of the optical path length adjusting component is set so that only the reflected distance measuring light as reflected by the optical path length adjusting component passes through the optical path splitting component, and the board thickness of the optical path length adjusting component is set so that a total of the optical path length of the distance measuring light and the optical length of the reflected distance measuring light as shortened by the optical path length adjusting component becomes equal to the optical path length of the reflected distance measuring light as passed through the optical path splitting component and extended.

Furthermore, the electro-optical distance measuring instrument according to the present invention comprises a scanning mirror for projecting the distance measuring light in rotary irradiation, and the reflected distance measuring light is configured so as to be received via the scanning mirror, wherein the scanning mirror is a transparent optical component for passing through the reflected distance measuring light, the optical path length adjusting components are composed of a first reflection coating as provided at a central part of a front surface of the transparent optical component and a second reflection coating as provided at a part other than a central part of a rear surface of the transparent optical component, and a board thickness of the transparent optical component is set so that the optical path length of the reflected distance measuring light as reflected by the first reflection coating and passed through the optical path splitting component becomes equal to the optical path length of the reflected distance measuring light as passed through the transparent optical component and reflected by the second reflection coating.

According to the present invention, the electro-optical distance measuring instrument comprises a light projecting optical system for projecting a distance measuring light as emitted from a distance measuring light source on a distance measuring optical axis, and a light receiving optical system for receiving a reflected distance measuring light from an object to be measured and for guiding to a light receiving element, wherein the light projecting optical system and the light receiving optical system are disposed so that a projection optical axis and a light receiving optical axis cross each other, an optical path splitting component for reflecting the distance measuring light to a crossing position of the projection optical axis and the light receiving optical axis and for passing through the reflected distance measuring light is provided, and optical path length adjusting components for correcting an optical path length of the reflected distance measuring light are disposed on the optical path of the reflected distance measuring light. As a result, the optical path splitting component need not the size that all of the reflected distance measuring lights can pass through, and it is possible to reduce a size and a weight of an optical system and to prevent an occurrence of a difference of the optical path length of the reflected distance measuring light by reducing a size of the optical path splitting component, and measurement accuracy can be improved.

DETAILED DESCRIPTION OF THE PREFERRED EMBODIMENT

A description will be given below on an embodiment of the present invention by referring to the attached drawings.

Figure 1:
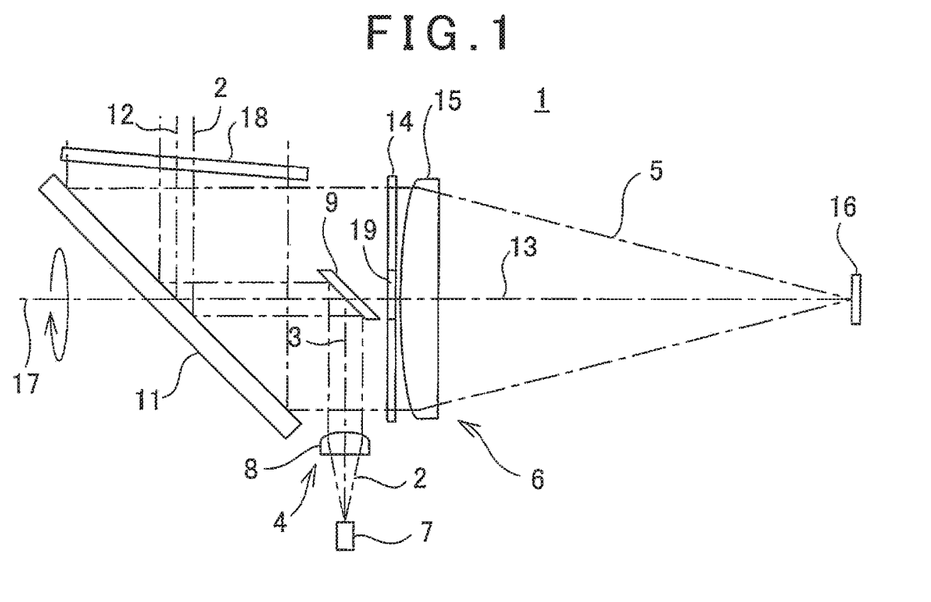
FIG. 1 is a block diagram to show an optical system of an electro-optical distance measuring instrument according to a first embodiment.

First, referring to FIG. 1, a description will be given on an electro-optical distance measuring instrument according to a first embodiment.

The electro-optical distance measuring instrument 1 is designed so as to be applied to a surveying instrument such as a laser scanner, a total station, or the like, for instance. It is to be noted that FIG. 1 shows a case where the electro-optical distance measuring instrument 1 of the present embodiment is applied to the laser scanner. The electro-optical distance measuring instrument 1 has a light projecting optical system 4 for projecting a distance measuring light 2 onto a projection optical axis 3, and a light receiving optical system 6 for receiving a reflected distance measuring light 5.

The light projecting optical system 4 has the projection optical axis 3, and a distance measuring light source 7, a collimator lens 8, and a beam splitter 9, which is an optical path splitting component, are provided on the projection optical axis 3. The beam splitter 9 deflects the projection optical axis 3 so as to enter a scanning mirror 11. The scanning mirror 11 deflects the projection optical axis 3 toward a distance measuring optical axis 12.

The light receiving optical system 6 has a light receiving optical axis 13, the light receiving optical axis 13 crosses the projection optical axis 3, and the beam splitter 9 is provided at this crossing position. The reflected distance measuring light 5 as entered along the distance measuring optical axis 12 is deflected toward the light receiving optical axis 13 by the scanning mirror 11. The light receiving optical axis 13 approximately coincides with the projection optical axis 3 and further passes through the beam splitter 9.

The distance measuring light source 7 is a semiconductor laser or the like, for instance, and emits an infrared light as an invisible light or a laser beam as a visible light as the distance measuring light 2 on the projection optical axis 3. Further, the distance measuring light source 7 is controlled by a control unit (not shown) so that the laser beam is emitted under the conditions as required, e.g. at a light intensity as required, or at a pulse interval (frequency) as required, or the like.

The collimator lens 8 is so designed that the distance measuring light 2 is turned to parallel luminous fluxes. The beam splitter 9 has such size as to reflect the distance measuring light 2 as turned to the parallel luminous fluxes. Further, the beam splitter 9 has such reflectivity as to reflect a part of the distance measuring light 2. For instance, the reflectivity is about 50% to 95%. Further, the beam splitter 9 functions as an optical deflecting component for deflecting the projection optical axis 3 toward the scanning mirror 11. Further, the beam splitter 9 is so designed that a part of the reflected distance measuring light 5 is passed through.

Further, on the light receiving optical axis 13, the beam splitter 9, an optical path length adjusting component 14, a condenser lens 15 and a light receiving element 16 are provided. The beam splitter 9 is positioned on a side of an object to be measured of the condenser lens 15 and is designed in an elliptical shape so that a shape as projected on a plane, which perpendicularly crosses the light receiving optical axis 13, becomes a circle. Alternatively, the beam splitter 9 may be in a rectangular shape.

The scanning mirror 11 is so designed to be rotatable around a rotary axis 17 as a center. A rotation of the scanning mirror 11 is controlled so that the scanning mirror 11 is rotated at a predetermined angle or is rotated at a predetermined rotation speed by the control unit. It is to be noted that the rotary axis 17 is approximately coaxial to the light receiving optical axis 13.

Further, the scanning mirror 11 reflects the distance measuring light 2 and irradiates the distance measuring light 2 toward an outside of the electro-optical distance measuring instrument 1 via a window unit 18. By the rotation of the scanning mirror 11, the distance measuring light 2 scans the object to be measured. The distance measuring light 2 as reflected by the object to be measured is designed so as to enter the scanning mirror 11 as the reflected distance measuring light 5, and to be reflected on the light receiving optical axis 13 by the scanning mirror 11. The window unit 18 is provided so as to tilt with respect to the distance measuring optical axis 12.

The optical path length adjusting component 14 is a transparent optical component, for instance, a glass plate, in which a hole 19 is formed at a central part, or the like, and an AR coating is provided on an entire surface of the optical path length adjusting component 14. A diameter of the hole 19 is approximately the same size as a diameter of a projected shape of the beam splitter 9 and is set in such a size that only the reflected distance measuring light 5 as passed through the beam splitter 9 can pass the hole 19.

Further, a board thickness of the optical path length adjusting component 14 is so designed that an optical path length as extended when the reflected distance measuring light 5 passes through the beam splitter 9 becomes equal to an optical path length as extended when the reflected distance measuring light 5 passes through the optical path length adjusting component 14. That is, the optical path length adjusting component 14 is designed so as to correct the optical path length of the reflected distance measuring light 5 which does not pass through the beam splitter 9.

The condenser lens 15 is an infinite conjugated lens, for instance, and the reflected distance measuring light 5 received as parallel luminous fluxes is focused to the light receiving element 16. It is to be noted that as the condenser lens 15, a multiple aspherical lens may be used.

The distance measuring light 2 as emitted from the distance measuring light source 7 is turned to parallel luminous fluxes by the collimator lens 8 and enters the beam splitter 9. The distance measuring light 2 is reflected at the right angle by the beam splitter 9, and is reflected at the right angle by the scanning mirror 11. Then, the distance measuring light 2 passes through the window unit 18 and is irradiated toward the object to be measured (not shown).

Further, by rotating the scanning mirror 11 by the control unit (not shown), the distance measuring light 2 is projected in rotary irradiation and the object to be measured is scanned by the distance measuring light 2.

In a case where the object to be measured is at a position farther than a predetermined distance, the distance measuring light 2 as diffused and reflected by the object to be measured passes through the window unit 18 and enters the scanning mirror 11 as the reflected distance measuring light 5 of parallel luminous fluxes with spread-out luminous fluxes. Further, in a case where the object to be measured is at a position closer than the predetermined distance, the distance measuring light 2 passes through the window unit 18 and enters the scanning mirror 11 as the reflected distance measuring light 5 of a diffused light with spread-out luminous fluxes.

Of the reflected distance measuring lights 5 as reflected by the scanning mirror 11, the reflected distance measuring light 5 as reflected by the central part of the scanning mirror 11 enters the beam splitter 9. Further, the reflected distance measuring light 5 as reflected by the part other than the central part of the scanning mirror 11 passes around the beam splitter 9.

The part of the reflected distance measuring light 5 passes through the beam splitter 9, passes the hole 19, and an image is formed on the light receiving element 16 by the condenser lens 15. Further, the reflected distance measuring light 5 as passed around the beam splitter 9 passes through the optical path length adjusting component 14, enters the condenser lens 15, and an image is formed on the light receiving element 16 by the condenser lens 15.

Here, the board thickness of the optical path length adjusting component 14 is set so that the optical path length as extended when the reflected distance measuring light 5 passes through the beam splitter 9 becomes equal to the optical path length as extended when the reflected distance measuring light 5 passes through the optical path length adjusting component 14. Therefore, the optical path length of the reflected distance measuring light 5 as passed through the optical path length adjusting component 14 becomes equal to the optical path length of the reflected distance measuring light 5 as passed through the beam splitter 9.

The reflected distance measuring light 5 is received on the light receiving element 16. The control unit (not shown) calculates a distance to the object to be measured based on a light receiving signal emitted from the light receiving element 16.

As described above, in the first embodiment, the optical path length adjusting component 14 is provided on the light receiving optical axis 13, in which the hole 19 is formed at the central part. By setting so that the optical path length adjusting component 14 corrects the optical path length of the reflected distance measuring light 5, which is passed around without entering the beam splitter 9, the optical path length of the reflected distance measuring light 5 as passed through the beam splitter 9 becomes equal to the optical path length of the reflected distance measuring light 5 as passed around the beam splitter 9.

Therefore, it is possible to prevent an occurrence of an error in a measurement result due to a difference of the optical path length between the reflected distance measuring light 5 as passed through the beam splitter 9 and the reflected distance measuring light 5 as passed around the beam splitter 9 and measurement accuracy can be improved.

Further, the beam splitter 9 as the optical path splitting component need not the size that all of the reflected distance measuring lights 5 which enter the condenser lens 15 can pass through. Therefore, the optical path splitting component can be miniaturized and it possible to reduce a size and a weight of the optical system of the electro-optical distance measuring instrument 1.

Further, the part of the reflected distance measuring lights 5 is so arranged as to pass through the beam splitter 9, enter the central part of the condenser lens 15, and be received on the light receiving element 16. Therefore, in particular, in a prism distance measurement of a short distance, even under the condition where the reflected distance measuring light 5 enters with narrow parallel luminous fluxes without sufficiently diffusing and the reflected distance measuring light 5 is interrupted by the beam splitter 9, a light amount of the reflected distance measuring light 5 can be sufficiently ensured by the reflected distance measuring light 5 as passed through the beam splitter 9 and it possible to perform the prism distance measurement of an extremely short distance.

Further, in a non-prism distance measurement of the short distance, even under the condition where the reflected distance measuring light 5 as focused by the condenser lens 15 is very out-of-focus on the light receiving element 16, the light amount of the reflected distance measuring light 5 can be sufficiently ensured by the reflected distance measuring light 5 as passed through the beam splitter 9 and it possible to perform the non-prism distance measurement of the extremely short distance.

Further, it is possible to extremely decrease a dynamic range of the light receiving amount of the short distance at a time of the non-prism distance measurement, and the distance measurement with high accuracy can be performed.

Figure 2:
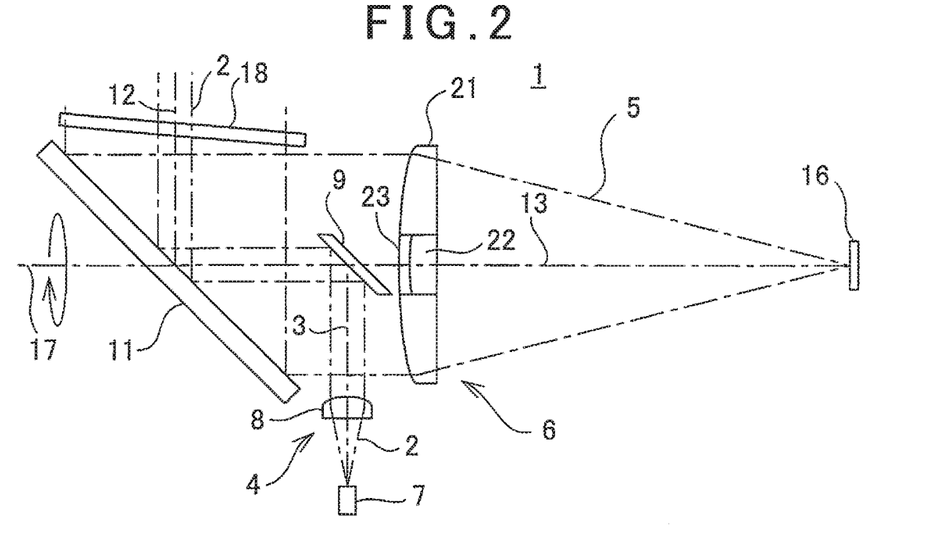
FIG. 2 is a block diagram to show an optical system of an electro-optical distance measuring instrument according to a second embodiment.

Next, referring to FIG. 2, a description will be given on an electro-optical distance measuring instrument 1 according to a second embodiment. It is to be noted that in FIG. 2, what are equivalent to components as shown in FIG. 1 are referred by the same symbol, and detailed description thereof will not be given here.

In the second embodiment, instead of the optical path length adjusting component 14 (see FIG. 1) and the condenser lens 15 (see FIG. 1) in the first embodiment, a condenser lens 21 is provided.

The condenser lens 21 is an infinite conjugated lens, for instance, in which a hole 23 is formed at a central part, and an optical path length adjusting component 22 is embedded and provided in the hole 23. It is to be noted that by mold processing from a front surface or a rear surface with respect to a normal infinite conjugated lens, the optical path length adjusting component 22 may be prepared. Further, on the front and rear surfaces of the optical path length adjusting component 22 and on a peripheral surface of the hole 23, an AR coating is provided.

A board thickness of the optical path length adjusting component 22 is set so that an optical path length of a reflected distance measuring light 5 when the reflected distance measuring light 5 passed through a beam splitter 9 and the optical path length adjusting component 22 becomes equal to an optical path length of the reflected distance measuring light 5 when the reflected distance measuring light 5 passed around the beam splitter 9 and enters the condenser lens 21.

In the second embodiment, the optical length of the reflected distance measuring light 5 as passed through the beam splitter 9 becomes equal to the optical path length of the reflected distance measuring light 5 as passed around the beam splitter 9. Therefore, it is possible to prevent an occurrence of an error in a measurement result due to a difference of the optical path length.

Further, in particular, in a distance measurement of a short distance, a sufficient light receiving amount for the distance measurement can be ensured by passing through the reflected distance measuring light 5 to the beam splitter 9 and entering a light receiving element 16.

Therefore, it is also possible in the second embodiment to miniaturize the beam splitter 9 as an optical path splitting component while sufficiently ensuring the light receiving amount of the reflected distance measuring light 5 at the short distance and at a long distance. Therefore, it is possible to reduce a size and a weight of the optical system of the electro-optical distance measuring instrument 1.

It is to be noted that in a case where the first embodiment and the second embodiment are used in a surveying instrument such as a total station, or the like, the scanning mirror 11 may be omitted. In this case, the distance measuring light 2 as reflected by the beam splitter 9 is directly irradiated toward the object to be measured and the reflected distance measuring light 5 from the object to be measured directly passes through the beam splitter 9.

Figure 3A:
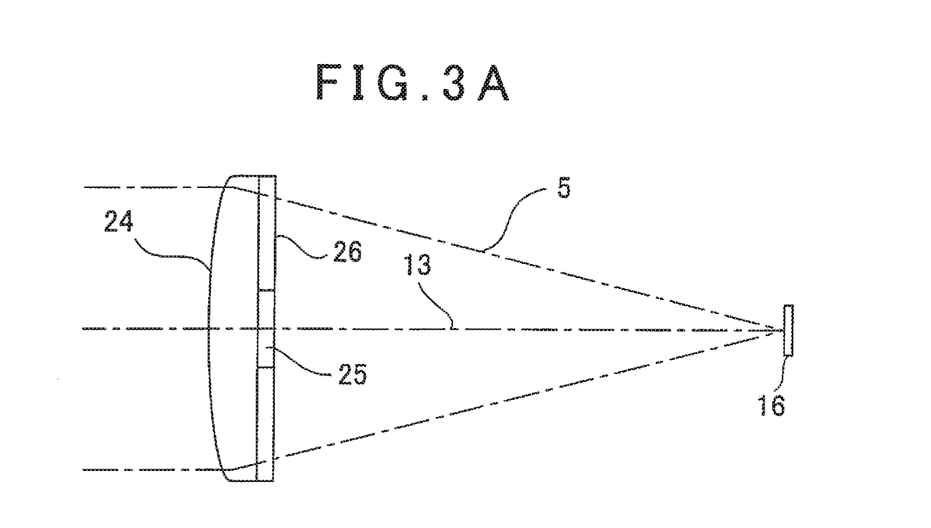
FIG. 3A is a block diagram to show a variation example of the optical system of the electro-optical distance measuring instrument according to the first embodiment.
Figure 3B:
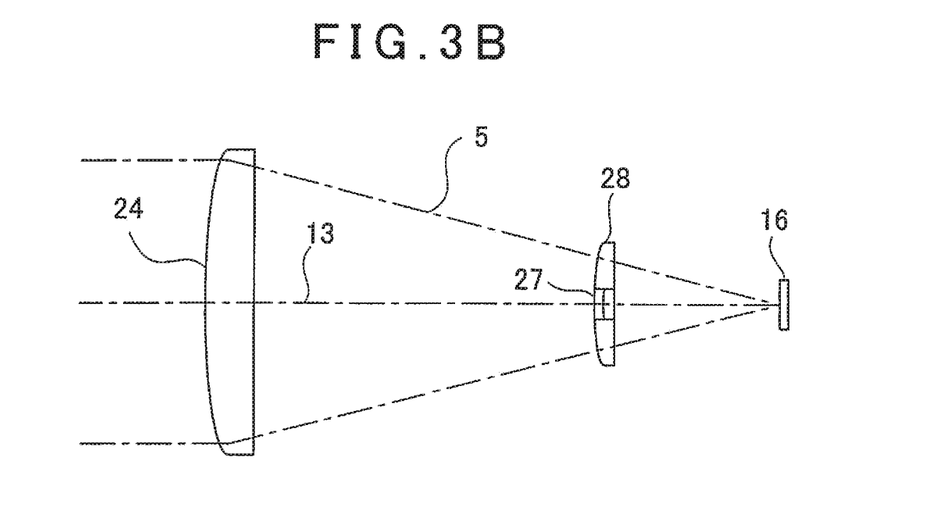
FIG. 3B is a block diagram to show a variation example of the optical system of the electro-optical distance measuring instrument according to the second embodiment.

FIG. 3A shows a variation example of the first embodiment and FIG. 3B shows a variation example of the second embodiment.

In FIG. 3A, an electro-optical distance measuring instrument 1 has a structure that an optical path length adjusting component 26 which is composed of a transparent optical component such as a glass plate, in which a hole 25 is formed at a central part of a plane (an emitting surface) of a condenser lens 24 (which is an infinite conjugated lens), or the like, are attached on and the condenser lens 24 and the optical path length adjusting component 26 are integrated with each other.

In the variation example of the first embodiment, also, the optical path length of the reflected distance measuring light 5 as passed through the beam splitter 9 and passed the hole 25 becomes equal to the optical path length of the reflected distance measuring light 5 as passed around the beam splitter 9 and passed through the optical path length adjusting component 26. Therefore, it is possible to miniaturize the optical system of the electro-optical distance measuring instrument 1 while ensuring a sufficient light receiving amount at the time of the distance measurement.

In FIG. 3B, a second condenser lens 28 where an optical path length adjusting component 27 is provided on the same optical axis and emitting side of the condenser lens 24 is additionally provided. The optical path length adjusting component 27 is formed by embedding a convex lens in the second condenser lens 28 or by mold processing the second condenser lens 28 from a front surface or a rear surface.

In the variation example of the second embodiment, also, the reflected distance measuring light 5 as passed through the beam splitter 9 passes through the optical path length adjusting component 27, and the reflected distance measuring light 5 as passed around the beam splitter 9 passes through the second focus lens 28. At this time, both optical path lengths of the reflected distance measuring lights 5 become equal to each other. Therefore, it is possible to miniaturize the optical system of the electro-optical distance measuring instrument 1 while ensuring a sufficient light receiving amount at the time of the distance measurement.

Further, since the second condenser lens 28 and the optical path length adjusting component 27 are provided on the same optical axis and emitting side as the condenser lens 24, it possible to miniaturize the components.

Figure 4:
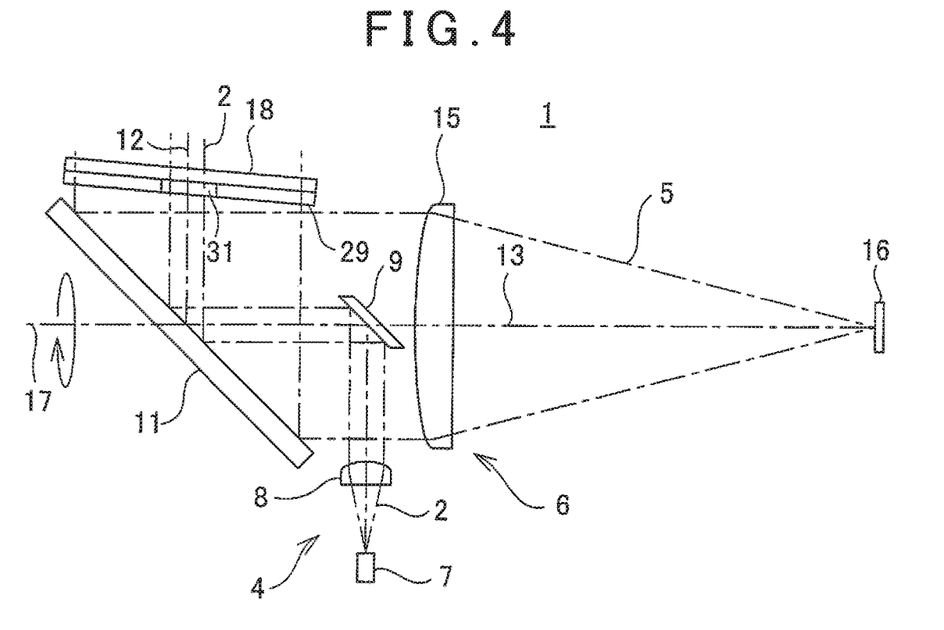
FIG. 4 is a block diagram to show an optical system of an electro-optical distance measuring instrument according to a third embodiment.

Next, referring to FIG. 4, a description will be given on an electro-optical distance measuring instrument 1 according to a third embodiment. In FIG. 4, what are equivalent to components as shown in FIG. 1 are referred by the same symbol, and detailed description thereof will not be given here.

In the third embodiment, an optical path length adjusting component 29 is attached on a window unit 18. The optical path length adjusting component 29 is a transparent optical component such as a glass plate, or the like, for instance, and a hole 31 is formed at a position as required, e.g. at a central part.

A size of the hole 31 is set in such a size that of reflected distance measuring lights 5 as reflected by an object to be measured (not shown), only the reflected distance measuring light 5, which enters the beam splitter 9 can pass. Further, a board thickness of an optical path length adjusting component 29 is set so that an optical path length when the reflected distance measuring light 5 passes through the beam splitter 9 becomes equal to an optical path length when the reflected distance measuring light 5 passes through the optical path length adjusting component 29.

In the third embodiment, also, the optical path length of the reflected distance measuring light 5 as passed through the beam splitter 9 becomes equal to the optical path length of the reflected distance measuring light 5 as passed around the beam splitter 9. Therefore, it is possible to miniaturize the optical system of the electro-optical distance measuring instrument 1 while ensuring a sufficient light receiving amount at the time of the distance measurement.

Figure 5:
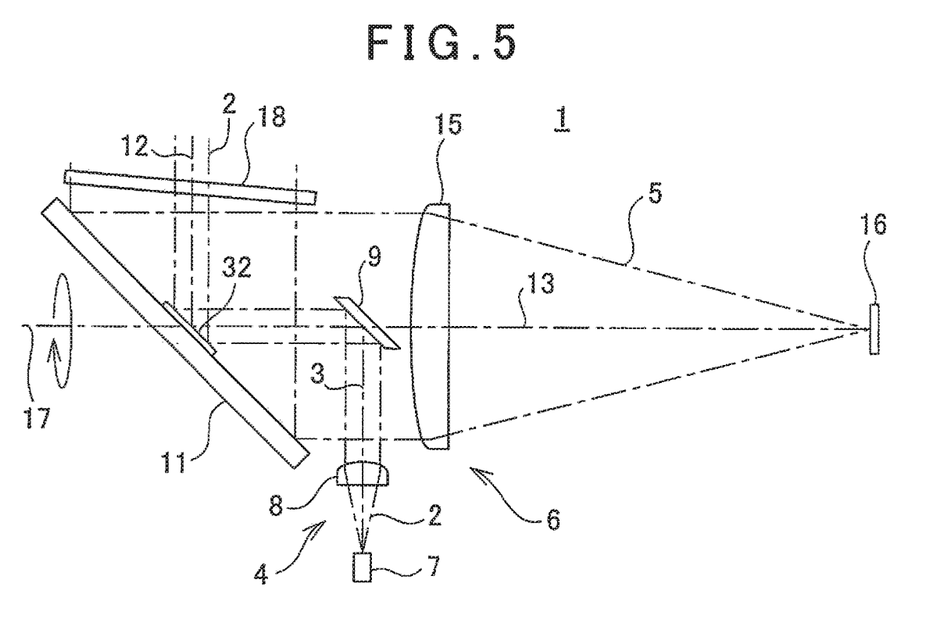
FIG. 5 is a block diagram to show an optical system of an electro-optical distance measuring instrument according to a fourth embodiment.

Next, referring to FIG. 5, a description will be given on an electro-optical distance measuring instrument 1 according to a fourth embodiment. In FIG. 5, what are equivalent to components as shown in FIG. 1 are referred by the same symbol, and detailed description thereof will not be given here.

In the fourth embodiment, an optical path length adjusting component 32 is attached at a central part of a reflection surface of a scanning mirror 11. The optical path length adjusting component 32 is a mirror having a thickness as required, for instance.

The optical path length adjusting component 32 is so designed as to reflect a distance measuring light 2 as emitted from a distance measuring light source 7 and reflect a reflected distance measuring light 5 as reflected by an object to be measured. That is, an optical path length of the distance measuring light 2 and an optical path length of the reflected distance measuring light 5 are shortened respectively by an amount of a board thickness of the optical path length adjusting component 32.

Therefore, the board thickness of the optical path length adjusting component 32 is set so that a total of the optical path length of the distance measuring light 2 and the optical path length of the reflected distance measuring light 5, which are shortened by the optical path length adjusting component 32, becomes equal to the optical path length as extended when the reflected distance measuring light 5 passes through a beam splitter 9. Further, a size of the optical path length adjusting component 32 is set in such a size that only the reflected distance measuring light 5 as reflected by the optical path length adjusting component 32 passes through the beam splitter 9.

In the fourth embodiment, also, the optical path length of the reflected distance measuring light 5 as passed through the beam splitter 9 becomes equal to the optical path length of the reflected distance measuring light 5 as passed around the beam splitter 9. Therefore, it is possible to miniaturize the optical system of the optical electro-optical distance measuring instrument 1 while ensuring a sufficient light receiving amount at the time of the distance measurement.

Figure 6:
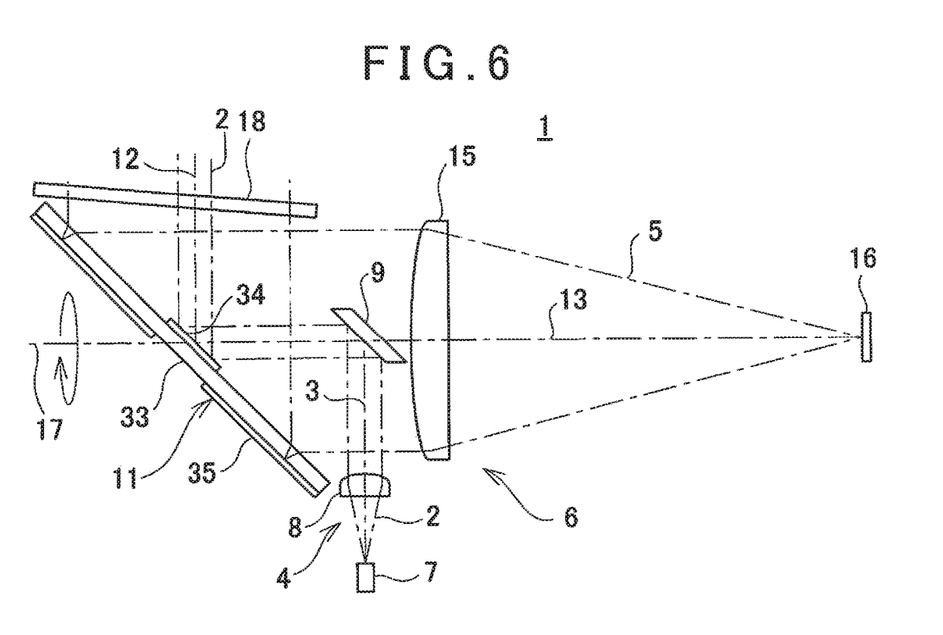
FIG. 6 is a block diagram to show an optical system of an electro-optical distance measuring instrument according to a fifth embodiment.

Next, by referring to FIG. 6, a description will be given on an electro-optical distance measuring instrument 1 according to a fifth embodiment. In FIG. 6, what are equivalent to components as shown in FIG. 1 are referred by the same symbol, and detailed description thereof will not be given here.

In the fifth embodiment, a scanning mirror 11 has a transparent optical component 33 such as a transparent glass plate, or the like, as a base, for instance. A first optical path length adjusting component 34, which is a reflection coating, is provided at a central part of a front surface (a reflection surface) of the transparent optical component 33. A second optical path length adjusting component 35, which is a reflection coating, is provided at a part other than a central part of a rear surface (a surface opposite to the reflection surface) of the transparent optical component 33.

In the fifth embodiment, a distance measuring light 2 as reflected by a beam splitter 9 is reflected by the first optical path length adjusting component 34. A reflected distance measuring light 5 from the object to be measured is so arranged as to pass through the beam splitter 9 after a part of the reflected distance measuring light 5 is reflected by the first optical path length adjusting component 34. Further, a remaining part of the reflected distance measuring light 5 passes through the transparent optical component 33 and passes around the beam splitter 9 after passing through the transparent optical component 33 and being reflected by the second optical path length adjusting component 35.

It is to be noted that a board thickness of the transparent optical component 33, and board thicknesses of the first optical path length adjusting component 34 and the beam splitter 9 are set so that an optical path length as extended when the reflected distance measuring light 5 passes through the transparent optical component 33 becomes equal to an optical path length as extended when the reflected distance measuring light 5 is shortened by the first optical path length adjusting component 34 and passes through the beam splitter 9.

Therefore, since the optical path length of the reflected distance measuring light 5 as passed through the beam splitter 9 becomes equal to the optical path length of the reflected distance measuring light 5 as passed around the beam splitter 9, it is possible to miniaturize the optical system of the electro-optical distance measuring instrument 1 while ensuring a sufficient light receiving amount at the time of the distance measurement.

It is to be noted that in the electro-optical distance measuring instrument 1 of the present invention, a visible camera, a laser pointer, a sighting telescope, an illumination optical system for tracking, or the like may be arranged as an optical system as provided coaxially or non-coaxially to the light projecting optical system 4 and the light receiving optical system 6 depending on a purpose of use.

Further, it is needless to say that the electro-optical distance measuring instrument 1 can be applied to general distance meters other than a surveying instrument such as a laser scanner, a total station, or the like.

The invention claimed is:

1. An electro-optical distance measuring instrument comprising; a light projecting optical system for projecting a distance measuring light as emitted from a distance measuring light source on a distance measuring optical axis, and a light receiving optical system for receiving a reflected distance measuring light from an object to be measured and for guiding to a light receiving element, wherein said light projecting optical system and said light receiving optical system are disposed so that a projection optical axis and a light receiving optical axis cross each other, an optical path splitting component for reflecting said distance measuring light to a crossing position of said projection optical axis and said light receiving optical axis and for passing through said reflected distance measuring light is provided, optical path length adjusting components for correcting an optical path length of said reflected distance measuring light are disposed on the optical path of said reflected distance measuring light, and said reflected distance measuring light is configured to pass through either said optical path splitting component or said optical path length adjusting components.

2. The electro-optical distance measuring instrument according to claim 1, wherein said optical path length adjusting components are transparent optical components, in which holes are formed at central parts, said holes are set in such a size that only said reflected distance measuring light as passed through said optical path splitting component passes, and a board thicknesses of said optical path length adjusting components are set so that the optical path length of said reflected distance measuring light as passed through said optical path splitting component and extended becomes equal to the optical path length of said reflected distance measuring light as passed through said optical path length adjusting component and extended.

3. The electro-optical distance measuring instrument according to claim 2, wherein said light receiving optical system has condenser lenses, and said optical path length adjusting components are provided at either one of an incident side or an emitting side of said condenser lenses.

4. The electro-optical distance measuring instrument according to claim 2, wherein said reflected distance measuring light from said object to be measured is configured so as to enter said light receiving optical system via a window unit, and said optical path length adjusting component is attached on said window unit.

5. The electro-optical distance measuring instrument according to claim 1, wherein said light receiving optical system has condenser lenses, in which a hole is formed at the central part, and said optical path length adjusting components as provided at said hole, and the board thicknesses of said optical path length adjusting components are set so that the optical path length of said reflected distance measuring light as passed through said optical path splitting component and said optical path length adjusting components becomes equal to the optical path length of said reflected distance measuring light which does not pass through said optical path splitting component.

6. The electro-optical distance measuring instrument according to claim 1 comprising a scanning mirror for projecting said distance measuring light in rotary irradiation, and said reflected distance measuring light is configured so as to be received via said scanning mirror, wherein said optical path length adjusting component is a mirror provided at a central part of said scanning mirror, a size of said optical path length adjusting component is set so that only said reflected distance measuring light as reflected by said optical path length adjusting component passes through said optical path splitting component, and the board thickness of said optical path length adjusting component is set so that a total of the optical path length of said distance measuring light and the optical length of said reflected distance measuring light as shortened by said optical path length adjusting component becomes equal to the optical path length of said reflected distance measuring light as passed through said optical path splitting component and extended.

7. The electro-optical distance measuring instrument according to claim 1 comprising a scanning mirror for projecting said distance measuring light in rotary irradiation, and said reflected distance measuring light is configured so as to be received via said scanning mirror, wherein said scanning mirror is a transparent optical component for passing through said reflected distance measuring light, said optical path length adjusting components are composed of a first reflection coating as provided at a central part of a front surface of said transparent optical component and a second reflection coating as provided at a part other than a central part of a rear surface of said transparent optical component, and a board thickness of said transparent optical component is set so that the optical path length of said reflected distance measuring light as reflected by said first reflection coating and passed through said optical path splitting component becomes equal to the optical path length of said reflected distance measuring light as passed through said transparent optical component and reflected by said second reflection coating.

* * * * *